(12) United States Patent
Murata et al.

(10) Patent No.: US 7,469,785 B2
(45) Date of Patent: Dec. 30, 2008

(54) STORAGE CASE

(75) Inventors: Morihiro Murata, Saitama (JP); Mitsunori Matsumura, Tokyo (JP); Ippei Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 10/554,216

(22) PCT Filed: Feb. 24, 2005

(86) PCT No.: PCT/JP2005/003553

§ 371 (c)(1), (2), (4) Date: Oct. 24, 2005

(87) PCT Pub. No.: WO2005/085096

PCT Pub. Date: Sep. 15, 2005

(65) Prior Publication Data

US 2006/0243613 A1    Nov. 2, 2006

(30) Foreign Application Priority Data

Mar. 8, 2004 (JP) ............................. 2004-064513

(51) Int. Cl.
*B65D 85/30* (2006.01)
*B65D 85/57* (2006.01)

(52) U.S. Cl. .................. 206/308.1; 206/493; 206/755; 206/759

(58) Field of Classification Search ................. 206/307, 206/308.1, 312, 752, 754, 755, 310, 493, 206/759; 312/9.41, 130
See application file for complete search history.

(56) References Cited

U.S. PATENT DOCUMENTS

| 4,006,821 | A | * | 2/1977 | Sautter | 206/379 |
| 5,176,250 | A | * | 1/1993 | Cheng | 206/748 |
| 5,429,228 | A | * | 7/1995 | Dahl | 206/755 |
| 5,685,425 | A | * | 11/1997 | Choi | 206/310 |

(Continued)

FOREIGN PATENT DOCUMENTS

JP    2727064    12/1997

(Continued)

OTHER PUBLICATIONS

International Search Report mailed May 24, 2005.

(Continued)

*Primary Examiner*—Jila M Mohandesi
*Assistant Examiner*—Sharon M Prange
(74) *Attorney, Agent, or Firm*—Rader, Fishman & Grauer PLLC; Ronald P. Kananen (57) ABSTRACT

A high-durability storage case is provided in which a disc can be smoothly inserted into and taken out from the storage case, and in which attachment and detachment operations of the disc can be stably performed. According to the storage case (2), a case body (3), a case cover (4), and a supporting plate (5) supporting a disc (1) are pivotally supported in a mutually openable/closeable manner by a four-link mechanism (16) defined by first, second, third, and fourth hinges (11), (12), (14), (15) and an arm segment (13). When the case cover (4) is opened or closed with respect to the case body (3), the supporting plate (5) is drawn into or drawn away from the case body (3) together with the case cover (4).

5 Claims, 11 Drawing Sheets

U.S. PATENT DOCUMENTS 5,915,563 A * 6/1999 Gefen et al. ............... 206/750
6,409,014 B1 * 6/2002 Hummell et al. ......... 206/308.1
6,540,071 B2 * 4/2003 Liu ........................ 206/308.1

FOREIGN PATENT DOCUMENTS

| JP | 2001-180780 | 7/2001 |
| JP | 2002-205787 | 7/2002 |
| JP | 2003-040380 | 2/2003 |
| JP | 2003-054675 | 2/2003 |

OTHER PUBLICATIONS

International Search Opinion dated Dec. 20, 2006 for International application No. PCT/JP2005/003553.

* cited by examiner

STORAGE CASE

TECHNICAL FIELD

The present invention relates to storage cases suitable for storing recording media, such as bare discs, e.g., optical discs, magneto-optical discs, and magnetic discs, and cassettes, e.g., floppy disc cassettes and video tape cassettes, or for storing various types of objects similar to these recording media.

BACKGROUND ART

A conventional example 1 (Japanese Unexamined Patent Application Publication No. 2001-180780) discusses a storage case for storing a bare disc in which a base end of a disc-supporting plate is fixed to a case body. The disc-supporting plate is biased upward at an angle from the case body due to the elasticity of the base end. When a case cover is to be closed over the case body in a state where a disc is held at an angle by a disc-holding portion provided on an upper surface of the disc-supporting plate, the disc-supporting plate is pushed into the case body with the case cover against the elasticity of the base end, whereby the disc-supporting plate and the disc become stored inside the case body. On the other hand, when the case cover is to be opened upward from the case body, the disc-supporting plate and the disc are pushed upward at an angle from the case body due to the elasticity of the base end of the disc-supporting plate.

Furthermore, a conventional example 2 (Japanese Unexamined Patent Application Publication No. 2003-40380) discusses another type of a storage case. In this storage case, a first end of a supporting plate, which can be bent into a substantially mound shape from a horizontal state via a hinge, is pivotally supported by a case cover, and a second end of the supporting plate is slidably latched to a case body. When the case cover is to be closed over the case body in a state where a disc is held by a disc-holding portion provided near the first end of an upper surface of the supporting plate, the second end of the supporting plate is slid horizontally in the case body, whereby the disc-holding portion and the disc become stored horizontally in the case body due to the hinge. On the other hand, when the case cover is to be opened by 180° from the case body, the first end of the supporting plate is drawn out from the case body so that the first end comes into contact with a contact portion provided on one end of the case body from above. This generates leverage, which allows the first end of the supporting plate to be pushed upward at an angle from the case body together with the disc.

On the other hand, another conventional example 3 (Japanese Registered Utility Model No. 3058139) discusses a storage case that stores video tape cassettes or compact discs for showcasing on store shelves. This storage case has a bendable lifting component folded back into an inequilateral trapezoid of shape. A front end of the lifting component is fixed to an inner surface of a case body, and a rear end of the lifting component is fixed to an inner side of a rear plate that connects the case body to a case cover. When the case cover is closed over the case body in a state where a compact disc is fitted to and held in a depressed holding portion provided on an upper side of the lifting component, the rear plate is erected perpendicularly with respect to the case body, and the upper side of the lifting component is set horizontally, whereby the compact disc is stored horizontally in the upper portion of the case body. In this state, the lower portion of the case body (i.e., a space below the compact disc) stores a video tape cassette. On the other hand, when the case cover is opened by 180° from the case body, the rear plate is set horizontally with respect to the case body. In this state, the upper side of the lifting component is tilted so that the compact disc can be taken out at an angle from the case body.

According to the structure of conventional example 1 in which the disc-supporting plate is pushed into the case body with the case cover against the elasticity of the base end when the case cover is being closed over the case body, the elastic force of the base end of the disc-supporting plate is strongest at an early stage of use. This means that a large resistance is present when the closing operation of the case cover is performed at the early stage of use. For this reason, conventional example 1 is operationally problematic since a large force is required for opening the case cover at the early stage of use. On the other hand, if the elasticity of the base end of the disc-supporting plate becomes deteriorated after a long usage, the disc-supporting plate cannot push the disc upward to a sufficient height from the case body when the case cover is opened. Consequently, this structure is problematic in having low durability.

On the other hand, according to the structure of conventional example 2, when the case cover is being opened by 180° from the case body, the first end of the supporting plate is drawn out from the case body so that the first end comes into contact with the contact portion on one end of the case body from above. Thus, in response to the leverage generated, the first end of the supporting plate is pushed upward at an angle from the case body together with the disc. This structure of conventional example 2 is problematic in that a strong impulse is constantly applied to the first end of the supporting plate. Consequently, since the first end of the supporting plate can be easily damaged, the conventional example 2 is problematic in having low durability, like the conventional example 1.

On the other hand, according to the structure of conventional example 3 in which a compact disc is stored horizontally in the upper portion of the case body when the case cover is closed over the case body, an inefficient space is formed in the lower portion of the case body (i.e., a space below the compact disc). In this case, since a large thickness is required for the case body, a storage case having this structure is not suitable for storing bare discs.

DISCLOSURE OF INVENTION

A storage case according to the present invention includes a case body; a case cover; a supporting plate whose one surface is provided with a holding segment for holding at least one portion of an object to be stored, the holding segment being disposed in a section of the one surface proximate to a base end of the supporting plate, the object being inserted into and taken out from the holding segment from a free end side of the supporting plate; and a four-link mechanism. The four-link mechanism includes a first hinge pivotally supporting the case body and the case cover in an openable/closeable manner; a second hinge via which the base end of the supporting plate is pivotally supported by the case body in an openable/closeable manner such that the holding segment of the supporting plate faces the case body; and a third hinge and a fourth hinge via which opposite ends of an arm segment disposed between the supporting plate and the case cover are pivotally supported by the supporting plate and the case cover in an openable/closeable manner. When the case cover is being closed over the case body in a state where said at least one portion of the object to be stored is held by the holding segment of the supporting plate, the object to be stored is rotated so as to be positioned below the supporting plate, whereby the object to be stored and the supporting plate become stored in a storing position of the case body. On the other hand, when the case cover is being opened from the case body, the stored object is rotated so as to be positioned above the supporting plate, whereby the stored object and the supporting plate are drawn out from the case body.

According to the present invention, when the case cover is opened or closed with respect to the case body, the four-link mechanism allows the supporting plate to be smoothly and efficiently rotated between a storing position in the case body and a position at which the supporting plate is drawn out from the case body. Thus, an object to be stored, such as a disc-shaped recording medium, can be readily inserted into or taken out from the storage case, and, moreover, each of the four hinges of the four-link mechanism is prevented from receiving a load. Accordingly, the present invention is advantageous in achieving a high-durability, high-quality storage case.

Furthermore, since the opened angle of the case cover and the opened angle of the supporting plate are always fixed, the preset invention is advantageous in that attachment and detachment operations of an object to be stored can be stably performed with respect to the holding segment of the supporting plate.

BEST MODE FOR CARRYING OUT THE INVENTION

When a case cover is closed towards a case body, an arm segment is fitted to a cutout provided in a supporting plate. This facilitates a thickness reduction of a storage case.

The supporting plate is provided with a circular-arc holding segment for holding a portion of an outer periphery of a disc-shaped recording medium; a low-height columnar portion engageable with a center hole of the disc-shaped recording medium; and a pedestal for holding a peripheral region of the center hole of the disc-shaped recording medium so as to keep the disc-shaped recording medium in an elevated state from the supporting plate. Thus, a recording surface of the disc-shaped recording medium can be protected, and moreover, the disc-shaped recording medium can be stably supported at two sections, namely, the outer periphery section and the center-hole section, whereby an ideal storage case for a disc-shaped recording medium is provided.

Furthermore, an end of the columnar portion of the supporting plate can be engaged to a circular hole provided in the case body. Thus, the center-hole section of the disc-shaped recording medium can be properly supported when the case cover is in a closed state. This prevents, for example, the recording surface from being damaged, which may be caused when the storage case is flipped over, vibrates, or receives an impulse, causing the disc-shaped recording medium to move inside the storage case. Accordingly, the disc-shaped recording medium can be stored safely.

By providing a case cover, a supporting plate, and a four-link mechanism on each of two sides of the case body, a high-quality, low-profile storage case can be achieved in which two objects, such as two disc-shaped recording media, can be stored simultaneously on the opposite sides of the case body in a non-contact fashion.

At least one of the case cover and the case body may be provided with an accessory storage portion so that an accessory, which may be a booklet such as a lyric sheet or an instruction manual, can be inserted into or taken out from the accessory storage portion. Accordingly, a storage case suitable for storing audio and video recording media or recording media intended for other various purposes can be provided.

FIRST EMBODIMENT

A storage case according to a first embodiment of the present invention will now be described with reference to the drawings. In the first embodiment, a storage case 2 is capable of storing bare 12-cm-diameter discs 1, which may be, for example, optical discs, magneto-optical discs, or magnetic discs. For example, each disc 1 may be a CD, a DVD, or a DVD-ROM. Alternatively, the storage case 2 can similarly store other types of bare discs having different diameters, such as 8-cm-diameter MO discs, by changing the dimension of the storage case 2.

The storage case 2 is composed of, for example, synthetic resin and includes two case covers 4 and two supporting plates 5 respectively attached to opposites sides of a case body 3, such that the storage case 2 is capable of storing two discs 1 on the opposites sides of the case body 3. Since the storage case 2 is symmetrical with respect to the case body 3, the structural description below will be directed to the relationships among the case body 3, the case cover 4 and the supporting plate 5 on one side of the case body 3.

A base end 4a of the case cover 4 is pivotally supported by one side of a base end 3a of the case body 3 via a first pair of left and right hinges (fulcrum pins) 11 which are concentric to each other, such that the case cover 4 is openable and closeable in the directions indicated by arrows a and b. On the other hand, a base end 5a of the supporting plate 5 is disposed proximate the base end 3a of the case body 3 and is pivotally supported by three second concentric hinges (fulcrum pins) 12, which are arranged parallel to the first hinges 11 and are separated from one another in a horizontal direction. Thus, the supporting plate 5 is openable and closeable in directions indicated by arrows c and d. Furthermore, a pair of left and right arm segments 13 having a rectangular plate-like structure and arranged parallel to each other in the horizontal direction is disposed between a section near the base end 5a of the supporting plate 5 and a section near the base end 4a of the case cover 4. Upper and lower ends (longitudinal ends) of the arm segments 13 are pivotally supported by the supporting plate 5 and the case cover 4, respectively, in a mutually openable/closeable manner via third hinges (bendable connection parts having elasticity) 14 and fourth hinges (fulcrum pins) 15. The third hinges 14 and the fourth hinges 15 are concentric to each other.

The first hinges 11, the second hinges 12, the third hinges 14, and the fourth hinges 15 define a four-link mechanism 16.

The rectangular-plate-like left and right arm segments 13 are integrally formed in a pair of left and right rectangular cutouts 17 via the third hinges 14 (i.e., the bendable connection parts having elasticity). The left and right rectangular cutouts 17 are disposed between the three second hinges 12 provided for the supporting plate 5. Thus, when the case cover 4 is closed, which will be described below in detail, the pair of left and right arm segments 13 is engaged to the pair of left and right cutouts 17 of the supporting plate 5 so as to be housed within the thickness of the supporting plate 5.

Sections of an upper surface of the supporting plate 5 (i.e., the surface facing the case body 3) near the base end 5*a* are integrally provided with circular-arc holding segments 5*b* (the multiple holding segments 5*b* together form a circular-arc shape) which hold portions of an outer periphery 1*a* of the corresponding disc 1. A central portion of a free end 5*c* of the supporting plate 5 is integrally provided with a low-height columnar portion 5*d* engageable with a center hole 1*b* of the disc 1 and a low-height circular pedestal 5*e* for keeping a peripheral region 1*c* around the center hole 1*b* of the disc 1 in an elevated state.

On the other hand, an inner surface of the case body 3 is provided with a circular recess 3*b* to which the disc 1 is fitted. The center of the recess 3*b* is provided with a circular hole 3*c* engageable with an end of the columnar portion 5*d* of the supporting plate 5. A peripheral region around the circular hole 3*c* is provided with a low-height circular pedestal 3*d* for holding the peripheral region around the center hole 1*b* of the disc 1. Moreover, sections of the case body 3 proximate to the base end 3*a* are provided with cutouts 3*e* engageable with the circular-arc holding segments 5*b* of the supporting plate 5.

An inner surface of the case cover 4 is provided with a circular recess 4*b* that provides a clearance space for the disc 1. The outer periphery portion of the circular recess 3*b* of the case body 3, the outer periphery portion of the circular recess 4*b* of the case cover 4, and the inner periphery portion of the holding segments 5*b* of the supporting plate 5 are respectively provided with ring-like pedestals 3*f*, 4*c*, and 5*f* for holding the outermost periphery portion of the disc 1.

One click-locking unit 7 including a protrusion 7*a* and a depression 7*b* or a pair of click-locking units 7 including protrusions 7*a* and depressions 7*b* is provided for locking the case cover 4 to the case body 3 when the case cover 4 is closed over the case body 3. Specifically, one click-locking unit 7 or each click-locking unit 7 is disposed between one of the left and right side surfaces 3*g* of the case body 3 and a corresponding one of the left and right side surfaces 4*f* of the case cover 4. Moreover, a central portion of a free end 4*d* of the case cover 4 is provided with a depression 4*e* which allows for fingertip insertion.

Figure 4:
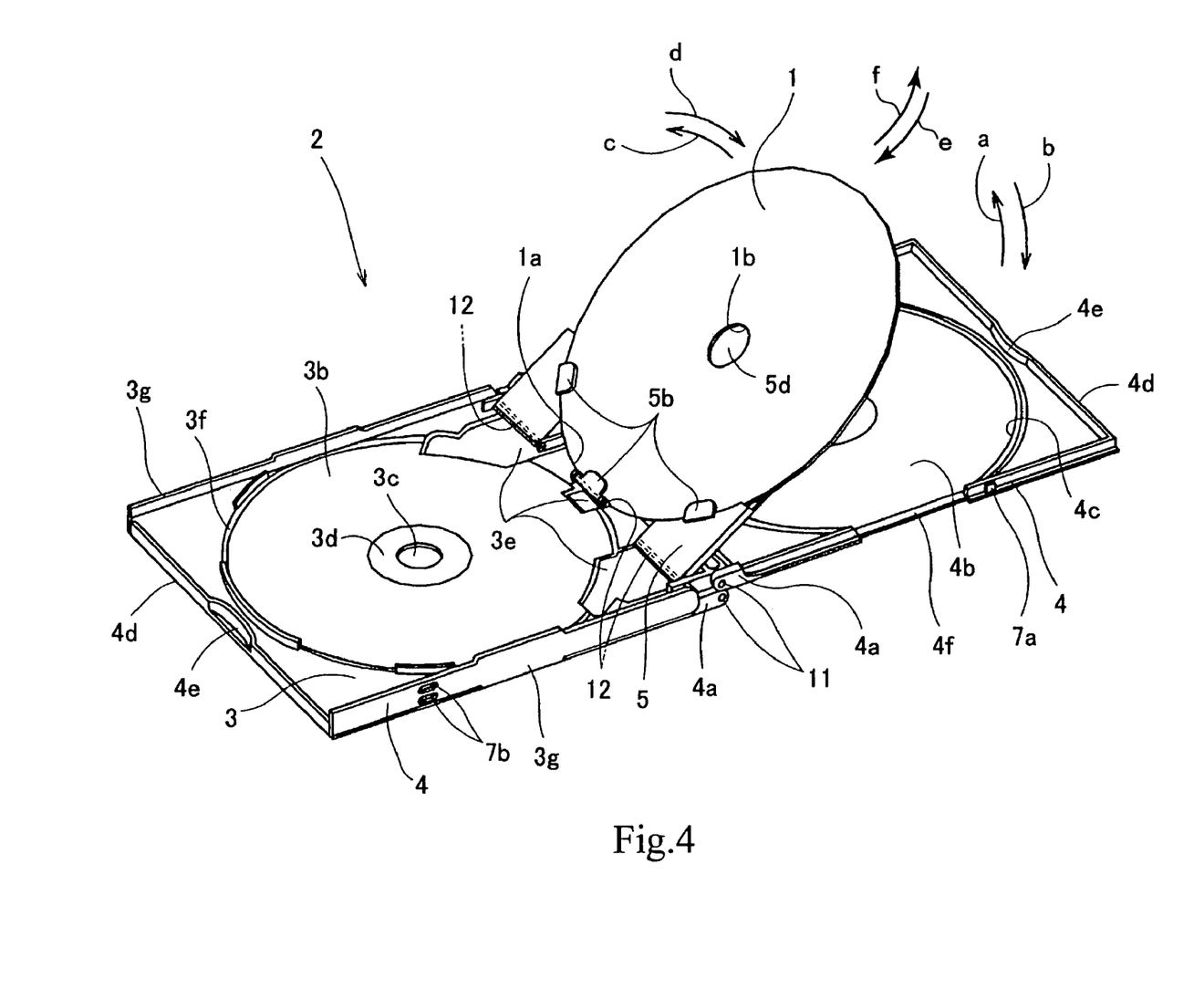
FIG. 4 is a perspective view illustrating a state where the case cover on one side of the storage case is opened by 180°.

Accordingly, the storage case 2 has the structure described above. When the disc 1 is to be stored, as shown in FIG. 4, the disc 1 is inserted at an angle from an upward direction indicated by an arrow e while a recording surface 1*d* of the disc 1 is faced downward. Subsequently, portions of the outer periphery 1*a* of the disc 1 are fitted into the holding segments 5*b* so as to be disposed on the ring-like pedestal 5*f*. The center hole 1*b* of the disc 1 is then fitted around the outer periphery of the low-height columnar portion 5*d* so that the peripheral region of the center hole 1*b* is placed on the circular pedestal 5*e*.

Consequently, the disc 1 is safely supported by the supporting plate 5 without the recording surface 1*d* being in contact with the supporting plate 5.

Figure 1:
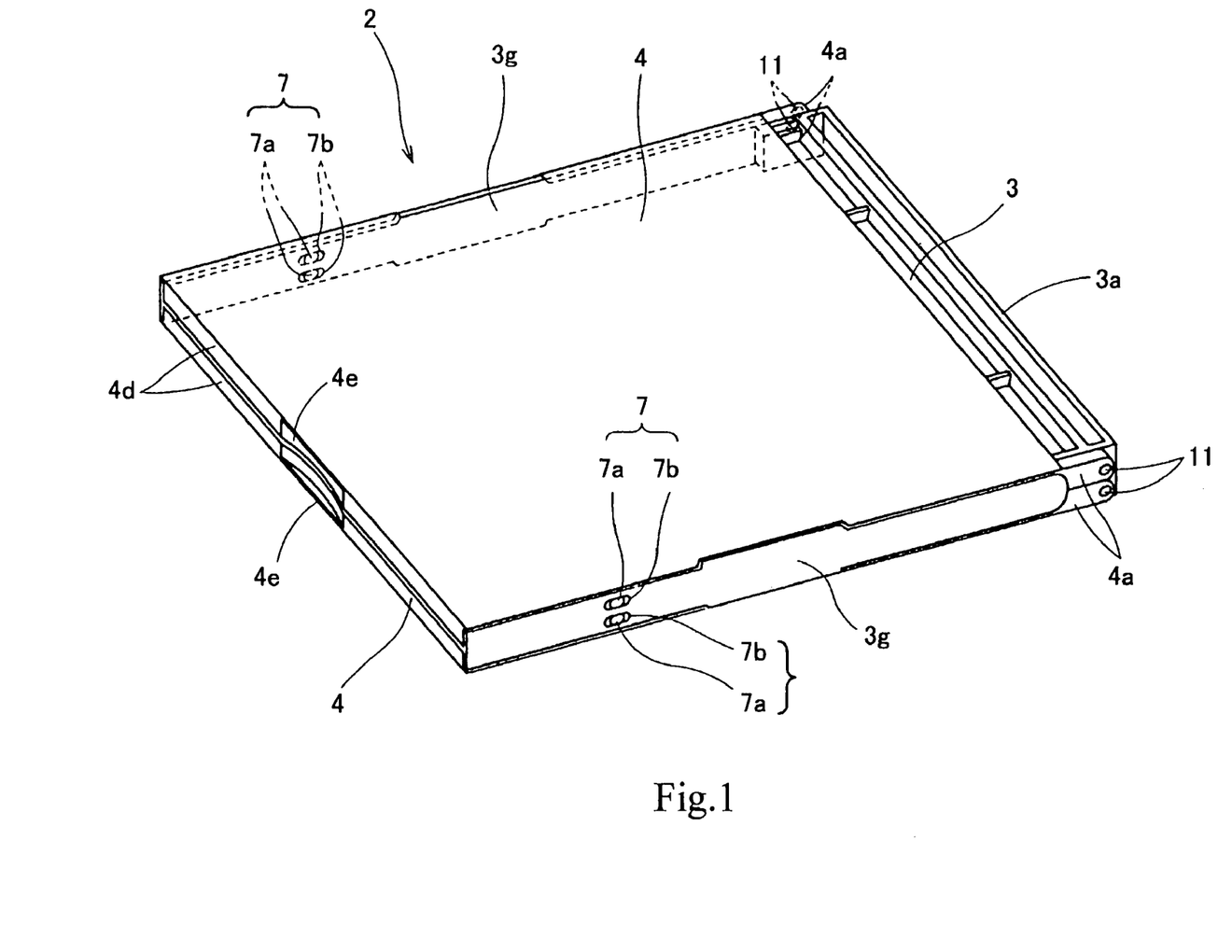
FIG. 1 is an external perspective view illustrating a state in which a disc is stored in a storage case according to a first embodiment of the present invention.
Figure 2:
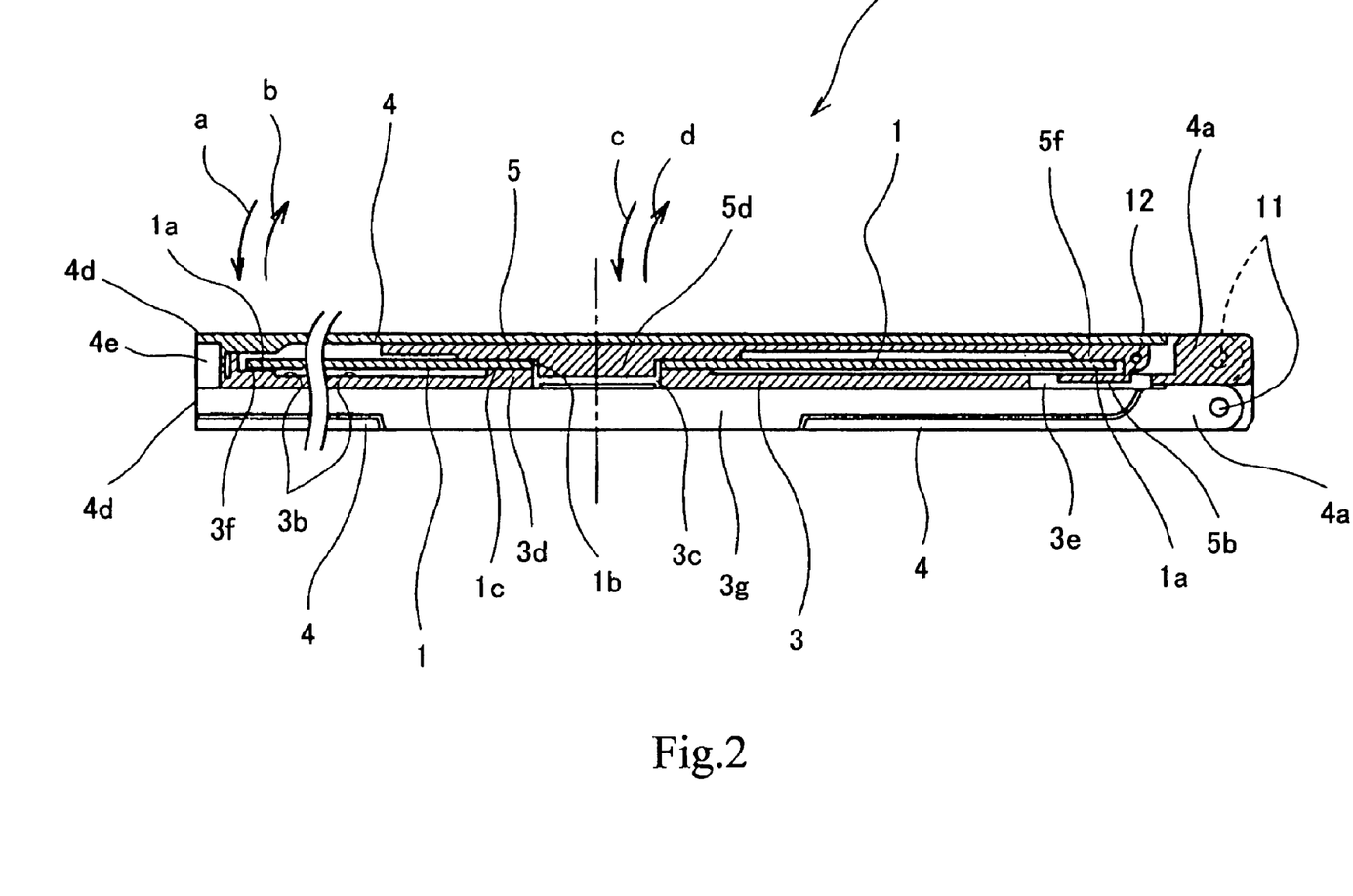
FIG. 2 is a side view including a cross section of an upper case cover shown in FIG. 1 and its interior portion.

Referring to FIG. 1 and FIG. 2, when the case cover 4 is moved in the closing direction indicated by the arrow a so as to be closed over the case body 3, the protrusions 7*a* and the depressions 7*b* of the click-locking units 7 become lightly locked to each other. During the closing motion of the case cover 4, the four-link mechanism 16 allows the supporting plate 5 to move in conjunction with the case cover 4, so that the supporting plate 5 is automatically folded into the case body 3 in the direction of the arrow c. As a result, the disc 1 is fitted into the case body 3 together with the supporting plate 5 in the direction of the arrow c, whereby the disc 1 becomes stored inside the case body 3 in a parallel fashion. In this state, the disc 1 is housed in the circular recesses 3*b*, 4*b* of the respective case body 3 and case cover 4, and the end of the columnar portion 5*d* of the supporting plate 5 is engaged to the circular hole 3*c* of the case body 3. Furthermore, the outer periphery 1*a* of the disc 1 is held by the ring-like pedestals 3*f*, 4*c* of the respective case body 3 and case cover 4 from opposite sides with respect to the vertical direction.

Accordingly, in addition to the case cover 4 being closed such that the disc 1 is properly supported by the supporting plate 5 while the recording surface 1*d* is faced downward, even if the case cover 4 is closed in a manner such that the disc 1 is mistakenly disposed on the supporting plate 5 while the recording surface 1*d* is faced upward, the disc 1 can be safely supported without the recording surface 1*d* coming into contact with the inner surfaces of the case cover 4 and the case body 3. Accordingly, this prevents the data on the disc 1 from being damaged, which may be caused when the recording surface 1*d* comes into contact with the inner surface of the case cover 4 or the case body 3.

Furthermore, when the disc 1 is in a stored state, the end of the columnar portion 5*d* of the supporting plate 5 extends through the center hole 1*b* of the disc 1 so as to be engaged to the circular hole 3*c* of the case body 3. This prevents the disc 1 from moving accidentally in the horizontal direction (i.e., a planar direction of the disc 1) between the case body 3 and the case cover 4, whereby the disc 1 can be stored safely inside the storage case 2.

Figure 6:
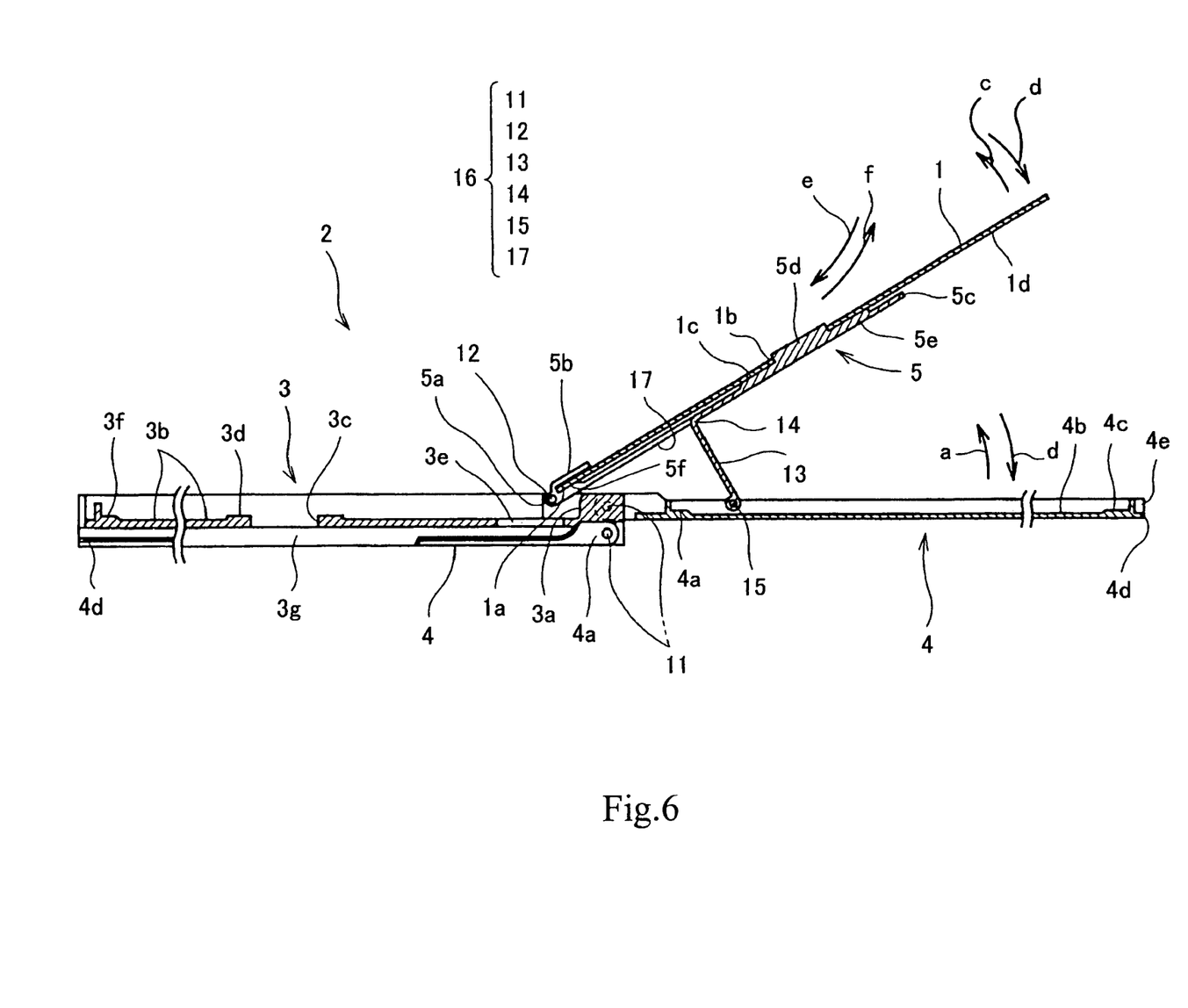
FIG. 6 is a cross-sectional view of FIG. 4.
Figure 7:
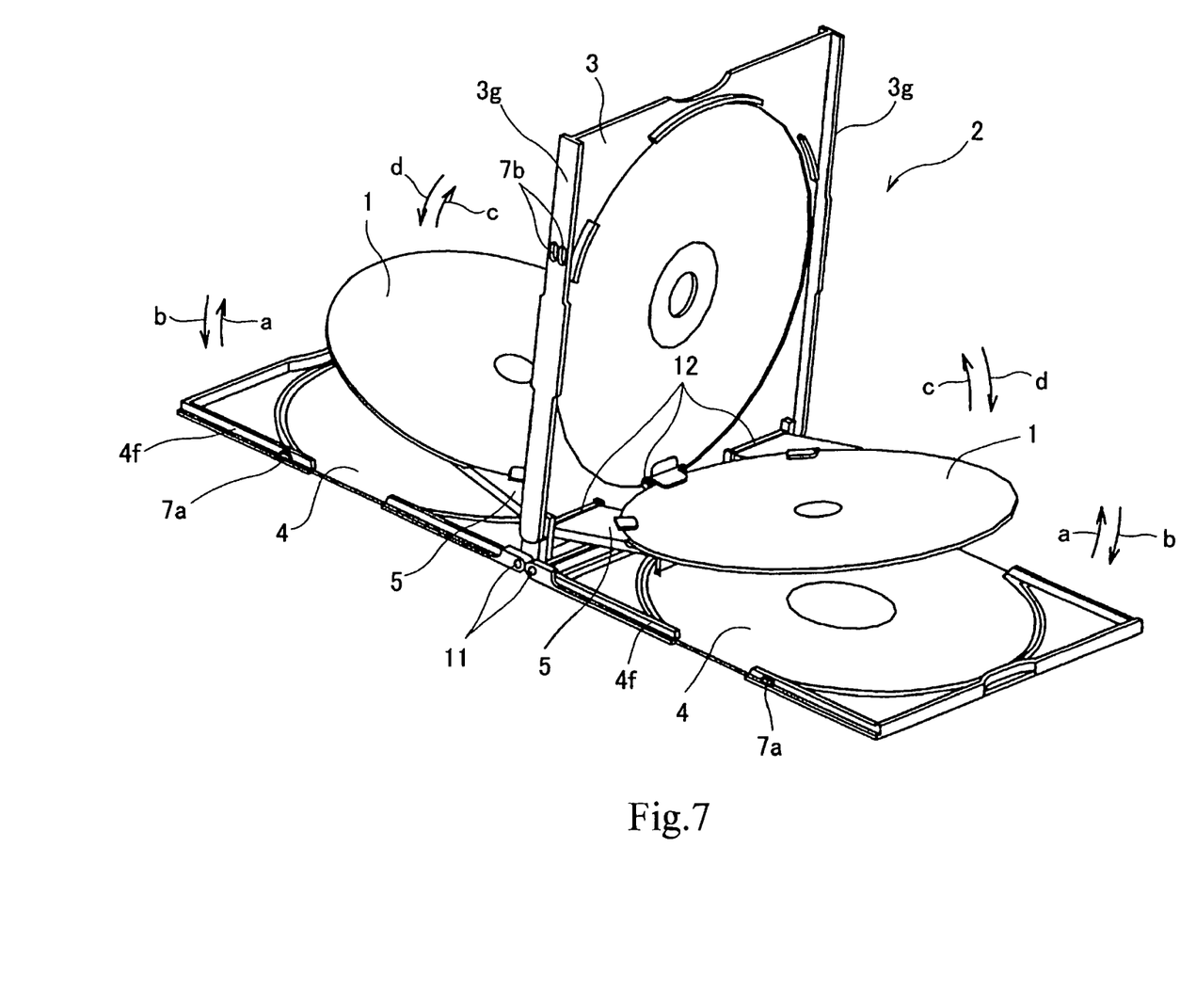
FIG. 7 is a perspective view illustrating a state in which both case covers on opposite sides of the storage case are opened by about 90°.
Figure 8:
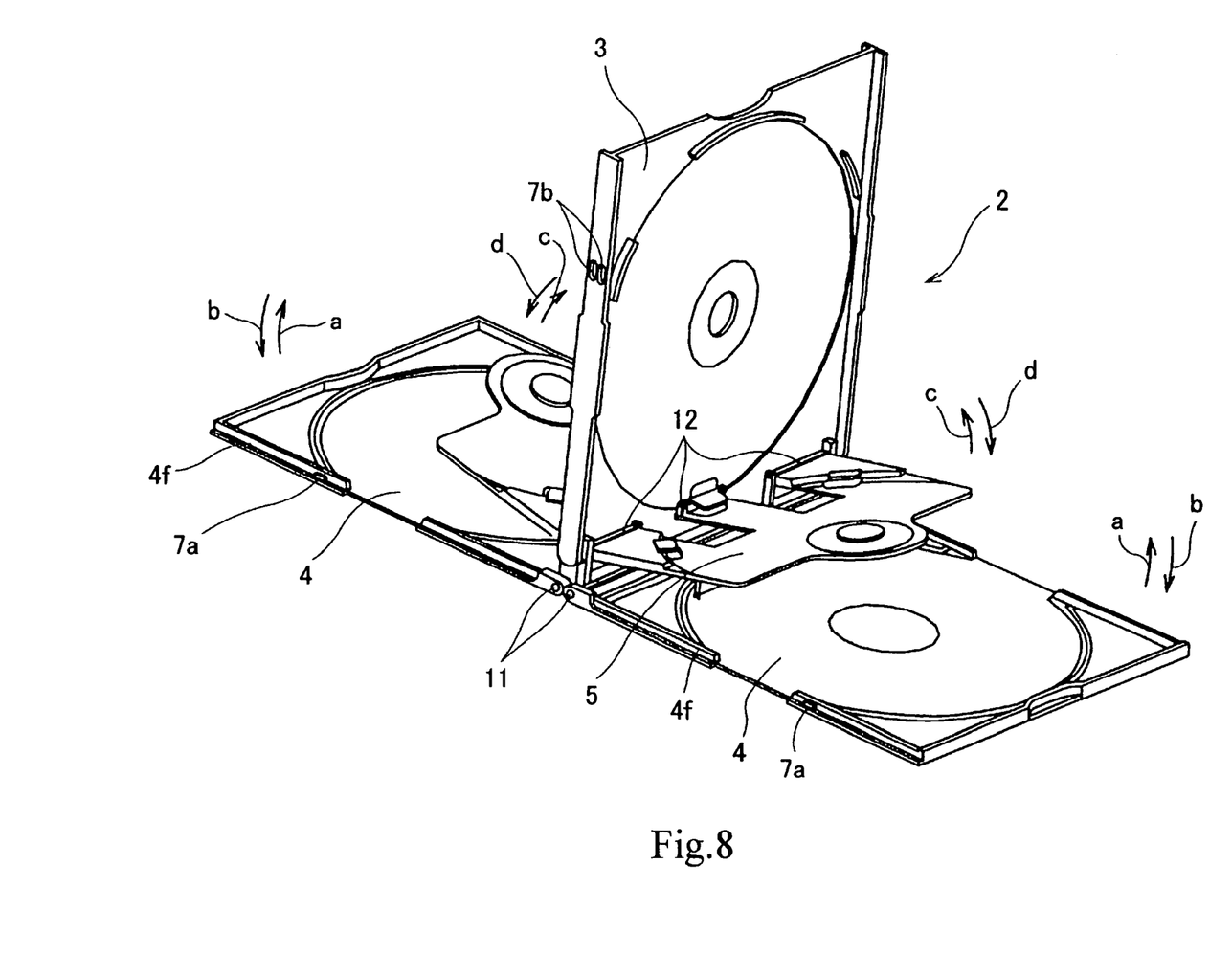
FIG. 8 is a perspective view illustrating a state in which both discs on the opposite sides shown in FIG. 7 are taken out.
Figure 9:
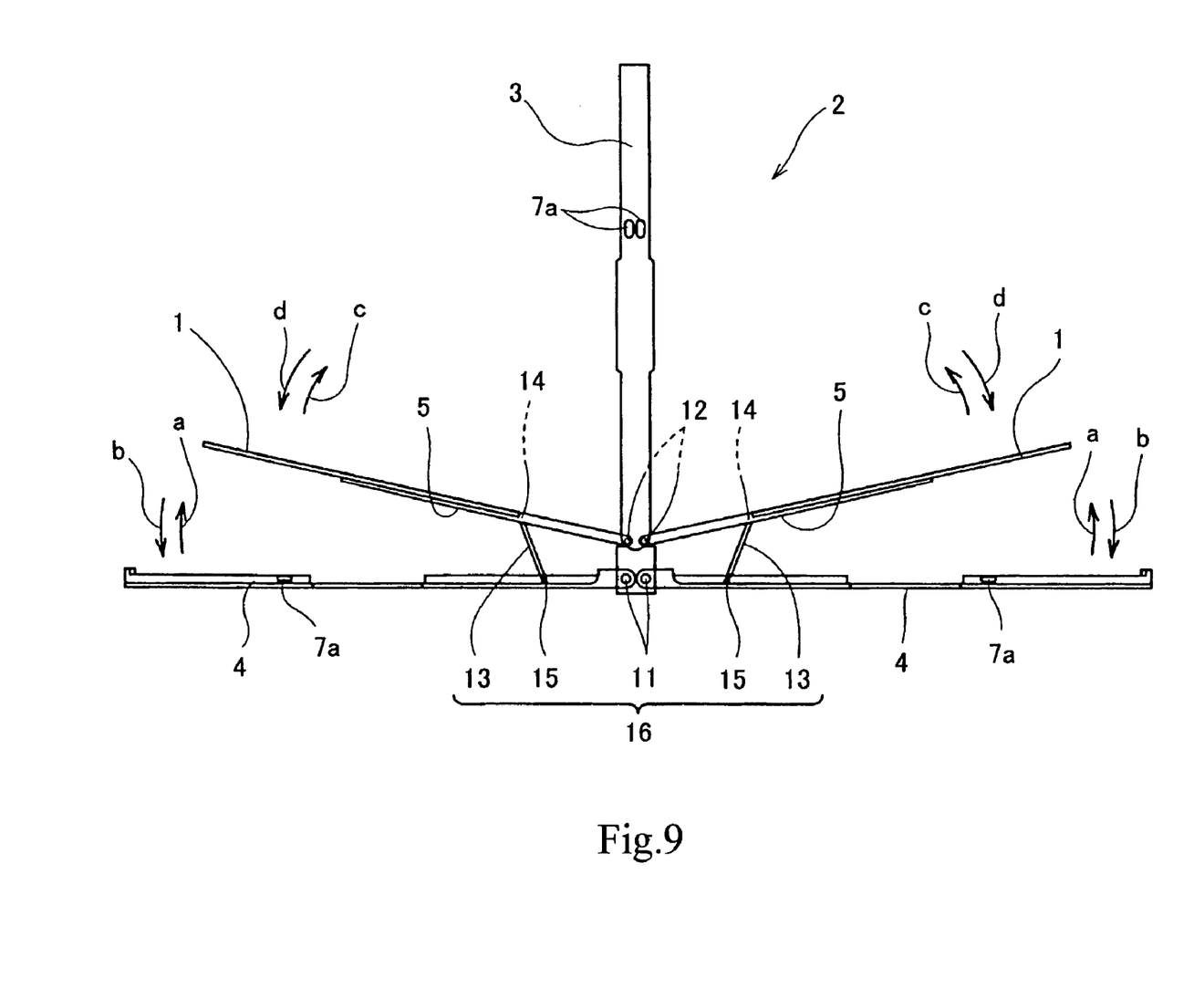
FIG. 9 is a side view of FIG. 7.
Figure 10:
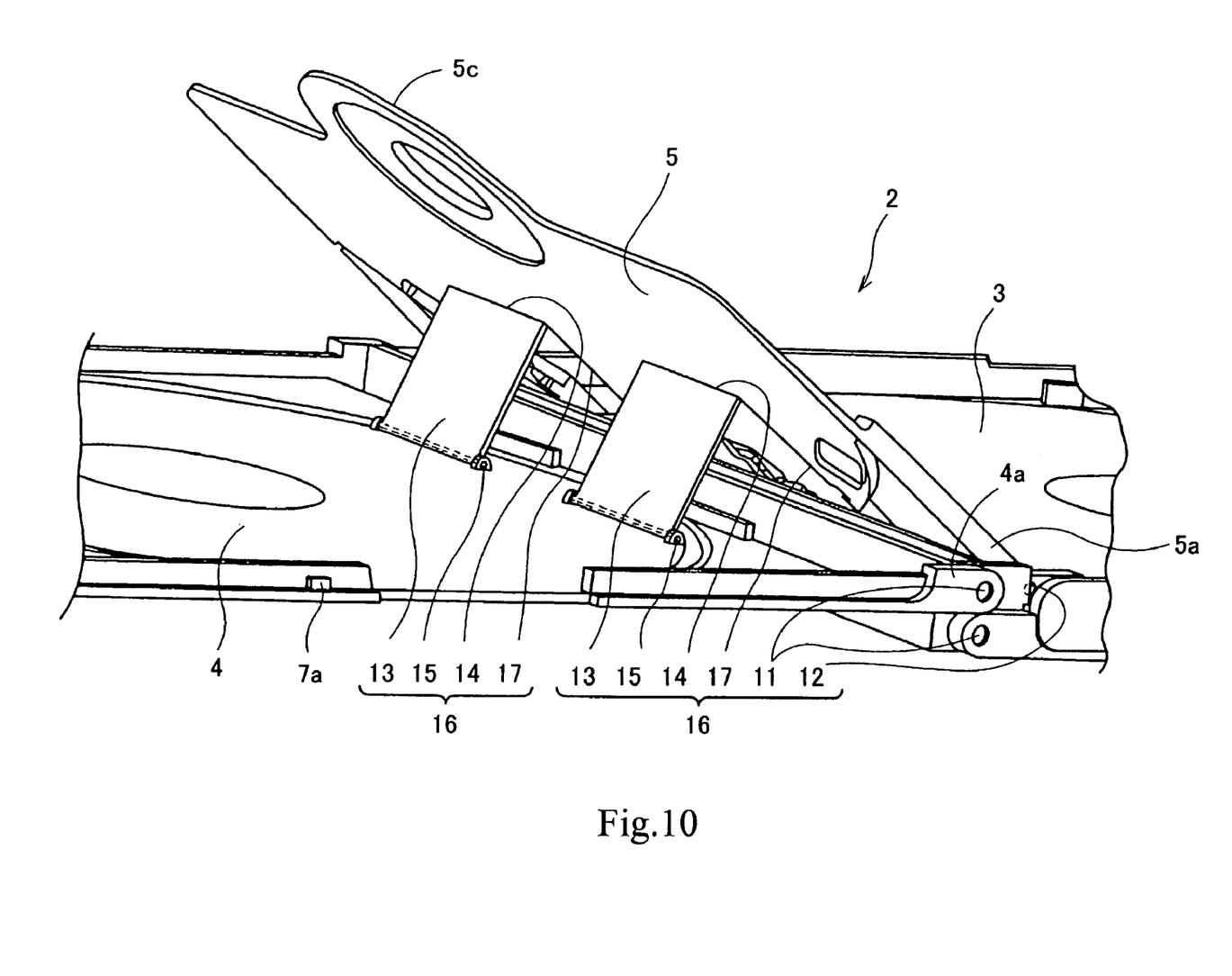
FIG. 10 is a perspective view of a four-link mechanism.

Furthermore, when the disc 1 is in a stored state, the pair of left and right plate-like arm segments 13 is respectively engaged to the pair of left and right cutouts 17 of the supporting plate 5 shown in FIG. 6 and FIG. 10. Thus, the arm segments 13 are housed within the thickness of the supporting plate 5, thereby facilitating a thickness reduction of the storage case 2.

Referring to FIG. 1 and FIG. 2, when the case cover 4 is completely closed over the case body 3, the protrusions 7*a* and the depressions 7*b* of the click-locking units 7 become locked to each other against elasticity, whereby the case cover 4 becomes locked to the case body 3.

Figure 3:
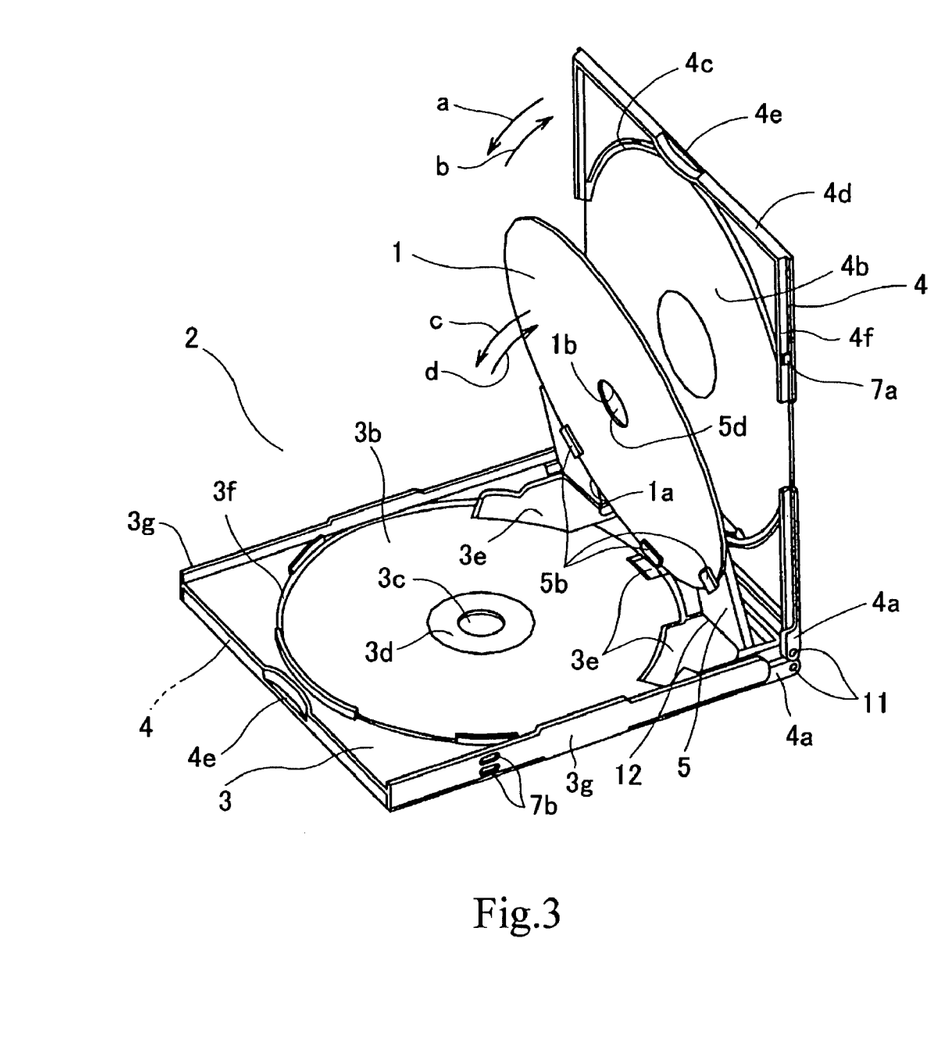
FIG. 3 is a perspective view illustrating a state in which the case cover on one side of the storage case is opened by about 90°.

On the other hand, referring to FIG. 3 and FIG. 4, the disc 1 can be taken out by inserting (hooking) a fingertip into the depression 4*e* provided at the free end 4*d* of the case cover 4 and then opening the case cover 4 upward in the direction of the arrow b from the case body 3 around the first hinges 11.

Subsequently, the four-link mechanism 16 allows the supporting plate 5 to rotate around the second hinges 12 so that the supporting plate 5 is opened upward in the direction of the arrow d from the case body 3. Thus, the disc 1 held by the holding segments 5*b* of the supporting plate 5 is drawn outward in the direction of the arrow d together with the supporting plate 5. Subsequently, the disc 1 may be gripped by holding opposite sides of the outer periphery 1*a* of the disc 1 with, for example, a thumb, a ring finger, a middle finger, and a little finger, and inserting an index finger into the center hole 1b of the disc 1. Accordingly, by slightly lifting the disc 1 upward at an angle from the supporting plate 5, the disc 1 can be readily pulled out upward at an angle from the holding segments 5b in a direction indicated by an arrow f.

Figure 5:
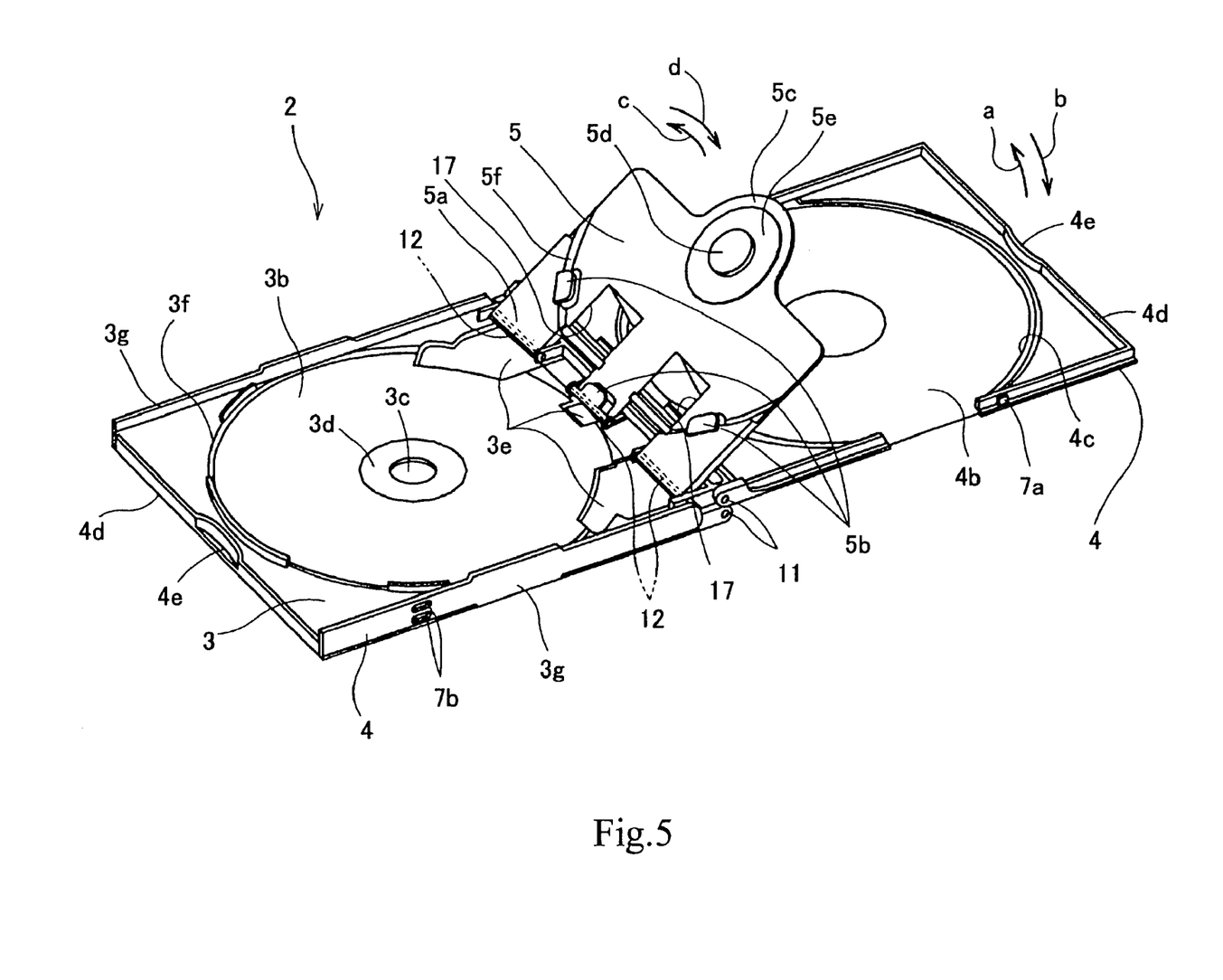
FIG. 5 is a perspective view illustrating a state in which the disc shown in FIG. 4 is taken out.

FIG. 4 to FIG. 6 illustrate a state in which one of the case covers 4 of the storage case 2 is opened by 180° in the direction of the arrow b from the case body 3. FIG. 7 to FIG. 10 illustrate a state in which the two case covers 4 are opened by 90° in the directions of the arrows b, such that the case body 3 of the storage case 2 is erected in a perpendicular fashion.

Figure 11:
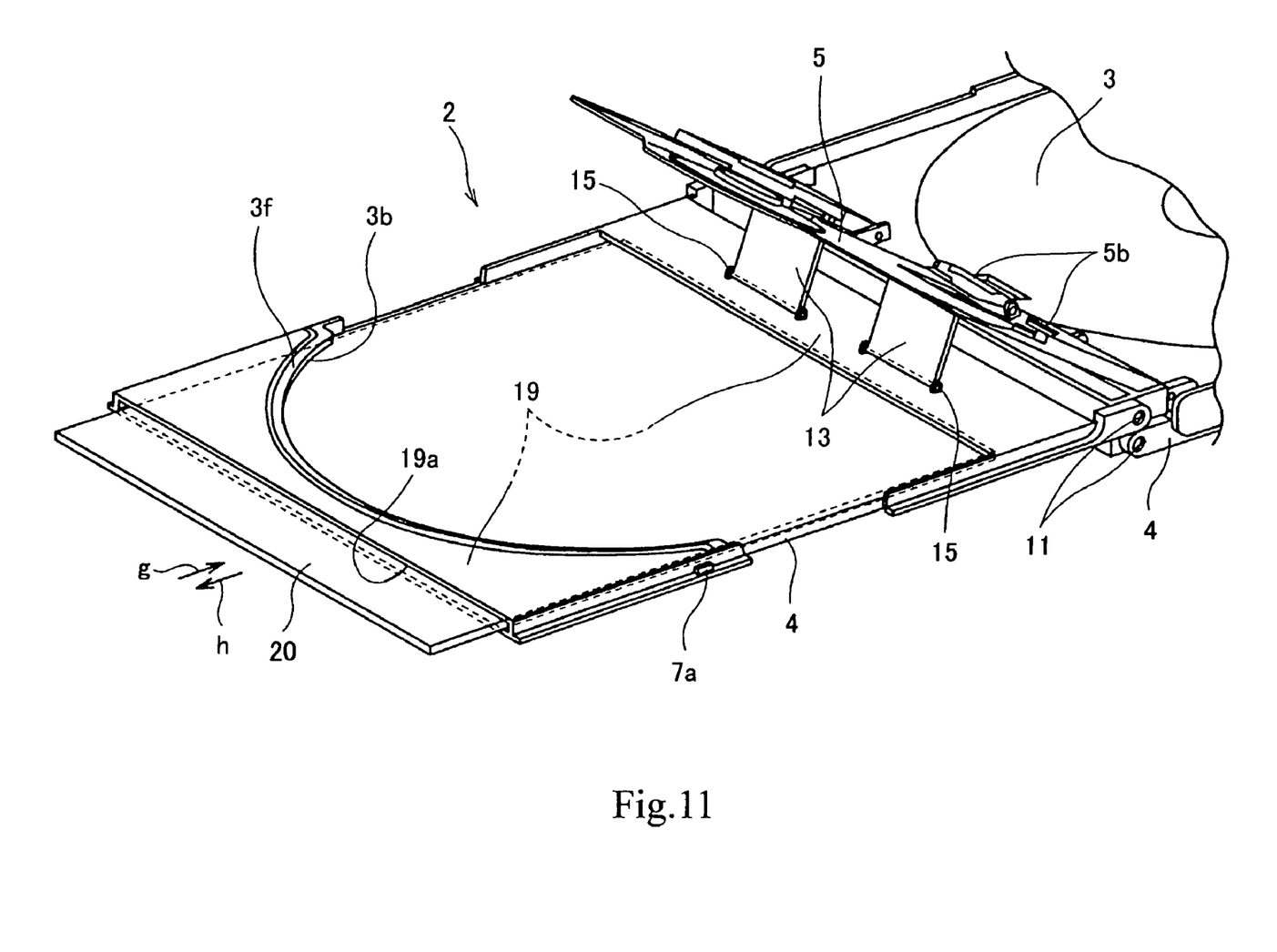
FIG. 11 is a perspective view of an accessory storage portion in one of the case covers.

Furthermore, FIG. 11 illustrates an accessory storage portion 19 defined by a low-height cavity provided in the interior side of (or the exterior side of) the case cover 4. An accessory 20, which may be a booklet such as a lyric sheet or an instruction manual, can be inserted into or taken out from the accessory storage portion 19 in directions indicated by arrows g, h through an opening 19a.

The accessory storage portion 19 contributes to a storage case 2 ideal for storing audio and video discs 1 or discs 1 intended for other various purposes.

In a case where the storage case 2 is a type that holds only one disc 1 such that only one case cover 4 is attached to one side of the case body 3, one of or each of the case body 3 and the case cover 4 may be provided with an accessory storage portion 19 similar to the above.

Although a storage case according to the first embodiment of the present invention has just been described above, modifications are permissible within the scope and spirit of the present invention.

For example, although the storage case 2 according to the first embodiment includes the pair of the case covers 4, the pair of the supporting plates 5, and the pair of the four-link mechanisms 16 respectively disposed on two opposite sides of the case body 3 in order to store two discs 1 at the opposite sides of the case body 3, the storage case 2 may alternatively be provided with a single case cover 4, a single supporting plate 5, and a single four-link mechanism 16 disposed only on one side of the case body 3. In this case, the storage case 2 stores one disc 1 on one side of the case body 3.

Furthermore, by modifying the shape and the dimension of the holding segments 5b or the thicknesses of the case body 3 and the case covers 4, the storage case 2 according to the present invention can store other types of objects. These types of objects to be stored may be disc-shaped or non-disc-shaped and may include, for example, smaller-size discs 1 such as MDs, compact cassettes, and video tape cassettes.

The invention claimed is:

1. A storage case comprising:
 a case body having a case body base end;
 a case cover;
 a supporting plate whose one surface is provided with a holding segment for holding at least one portion of an object to be stored, the holding segment being disposed in a section of said one surface proximate a base end of the supporting plate, the object being inserted into and taken out from the holding segment from a free end side of the supporting plate, the supporting plate having a supporting plate cutout formed therethough; and
 a four-link mechanism including a first hinge pivotally supporting the case body and the case cover at the case body base end in an openable/closeable manner; a second hinge via which the base end of the supporting plate is pivotally supported by the case body at the case body base end in an openable/closeable manner such that the holding segment of the supporting plate faces the case body; and a third hinge and a fourth hinge via which opposite ends of an arm segment disposed between the supporting plate and the case cover are pivotally supported by the supporting plate and the case cover in an openable/closeable manner such that, upon opening or closing the case cover relative to the case body, the supporting plate and the case cover move simultaneously with one another, wherein when the case cover is being closed over the case body in a state in which said at least one portion of the object to be stored is held by the holding segment of the supporting plate, the object to be stored is rotated so as to be positioned below the supporting plate, whereby the object to be stored and the supporting plate become stored in a storing position of the case body, and wherein when the case cover is being opened from the case body, the stored object is rotated so as to be positioned above the supporting plate, whereby the stored object and the supporting plate are drawn out from the case body and, upon closing the case cover relative to the case body, the support plate, the second hinge, the third hinge and the fourth hinge are enclosed within the case cover and the case body and the supporting plate cutout receives the arm segment, the arm segment being totally received within the supporting plate cutout.

2. The storage case according to claim 1, wherein each of two sides of the case body is provided with the case cover, the supporting plate, and the four-link mechanism.

3. The storage case according to claim 1, wherein at least one of the case cover and the case body is provided with an accessory storage portion so that an accessory can be inserted into or taken out from the accessory storage portion, and wherein the accessory includes a booklet or an instruction manual.

4. A storage case, comprising:
 a case body;
 a case cover;
 a supporting plate whose one surface is provided with a holding segment for holding at least one portion of an object to be stored, the holding segment being disposed in a section of said one surface proximate a base end of the supporting plate, the object being inserted into and taken out from the holding segment from a free end side of the supporting plate; and
 a four-link mechanism including a first hinge pivotally supporting the case body and the case cover in an openable/closeable manner; a second hinge via which the base end of the supporting plate is pivotally supported by the case body in an openable/closeable manner such that the holding segment of the supporting plate faces the case body; and a third hinge and a fourth hinge via which opposite ends of an arm segment disposed between the supporting plate and the case cover are pivotally supported by the supporting plate and the case cover in an openable/closeable manner such that, upon opening or closing the case cover relative to the case body, the support plate and the case cover move simultaneously with one another, wherein when the case cover is being closed over the case body in a state in which said at least one portion of the object to be stored is held by the holding segment of the supporting plate, the object to be stored is rotated so as to be positioned below the supporting plate, whereby the object to be stored and the supporting plate become stored in a storing position of the case body, and wherein when the case cover is being opened from the case body the stored object is rotated so as to be positioned above the supporting plate, whereby the stored object and the supporting plate are drawn out from the case body, wherein the holding segment includes a circular-arc portion for holding a portion of an outer periphery of a disc-shaped recording medium; a low-height columnar portion engageable with a center hole of the disc-shaped recording medium; and a low-height circular pedestal for holding a peripheral region around the center hole of the disc-shaped recording medium so as to keep the disc-shaped recording medium in an elevated state from the supporting plate.

5. The storage case according to claim 4, wherein the case body is provided with a circular hole engageable with an end of the columnar portion of the supporting plate.

* * * * *